Oct. 13, 1953   C. W. LIGHTHALL   2,655,392
SHIELDED ANTIFRICTION BEARING
Filed July 2, 1949

INVENTOR.
CONE W. LIGHTHALL
BY
Barnes, Kisselle, Laughlin & Raisch
ATTORNEYS.

Patented Oct. 13, 1953

2,655,392

UNITED STATES PATENT OFFICE 2,655,392

SHIELDED ANTIFRICTION BEARING

Cone W. Lighthall, Ann Arbor, Mich., assignor to Hoover Ball & Bearing Company, Ann Arbor, Mich., a corporation of Michigan Application July 2, 1949, Serial No. 102,803

1 Claim. (Cl. 286—5)

This invention relates to a shielded anti-friction bearing wherein a shielding structure is provided which bridges the space between the inner and outer race members to thereby close that space.

The anti-friction bearing involved is one which has inner and outer race members with rolling elements therebetween and these elements may be balls or rollers. Sometimes it is desirable to have one or more shields for closing the area between the race members to hold lubricant therein or to prevent lubricant from passing therethrough. For example, where a bearing of this kind is used for supporting rotary parts which are mounted in a casing containing lubricant, the seal structure may be provided to prevent the lubricant from escaping from the case by passing between the inner and outer race members.

Various attempts have been made to provide shields, and materials such as felt or rubber have been heretofore proposed, the felt or rubber having a frictional engagement with one race member. The felt becomes hardened or glazed with engagement of the frictional contact and when this occurs the seal is destroyed. Furthermore, the lubricant picks up the lint from the felt. Likewise, the rubber, usually synthetic, becomes hard and glazed at the location of the contact and some pieces break off and these pieces and the carbon in the rubber becomes mixed with the lubricant. The result is that the function of the seal is destroyed and there is liable to be a bearing failure.

The present invention resides largely in employing an element which serves as an oil slinger to constantly throw the lubricant back into the bearing and the oil slinger embodies a thermosetting plastic element. In conjunction with this, there is a metallic holding ring of elastic metal having a frictional engagement with the plastic element with the arrangement being such and the frictional engagement light to thus minimize friction. While the device of the present invention may be considered basically as a shield, two of such devices may be used in the bearing, one on each side of the rolling elements, to thus serve as sealing elements for holding lubricant within the bearing.

A structure made in accordance with the present invention is shown in the accompanying drawings.

Figure 2:
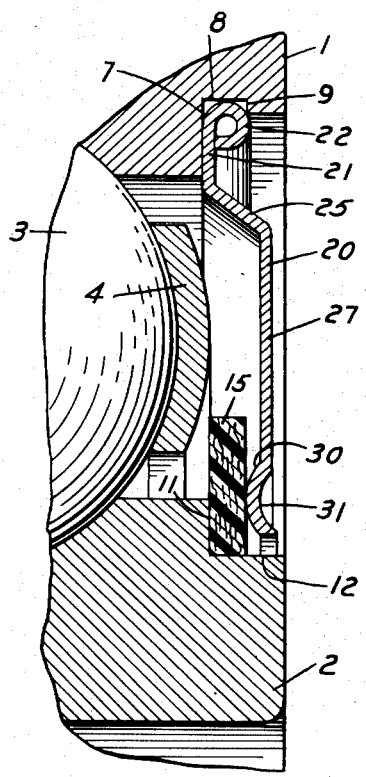
Fig. 2 is an enlarged cross sectional view illustrating the shield structure.

The bearing shown is a ball bearing having an outer race member 1 and an inner race member 2, the races being grooved for receiving balls 3, preferably held in spaced relationship by a suitable retainer 4.

The outer race member is formed with an inwardly facing groove defined by an inner substantially radial wall, a bottom wall 8 and an outer wall 9. The inner race is formed with a substantially radial wall 11 and a projecting part with a circumferential wall 12.

The plastic sealing element of the oil slinging type is generally shown at 15. This plastic element is a thin ring of material which may be about .025 of an inch in thickness. In order to give such a small ring element adequate strength, it is preferably reinforced with a fabric and linen is a preferred fabric. Such substance is termed linen Bakelite. That is to say, linen fibers are embedded in the thermo-setting plastic, which is preferably Bakelite or a plastic substance of a similar nature. A ring of fiber material would serve the purpose, but due to the exceedingly small dimensions, it is difficult to get a piece of fiber which is strong enough. Accordingly, the reinforced thermo-setting plastic is thought to be preferred in order to give long life to the structure. This sealing ring is positioned over the peripheral shoulder 12 of the inner race and placed up against the radial shoulder 10. Preferably the ring fits sufficiently snugly in position so that it remains fixed relative to the inner race. If the inner race rotates, then the ring rotates with it.

Figure 3:
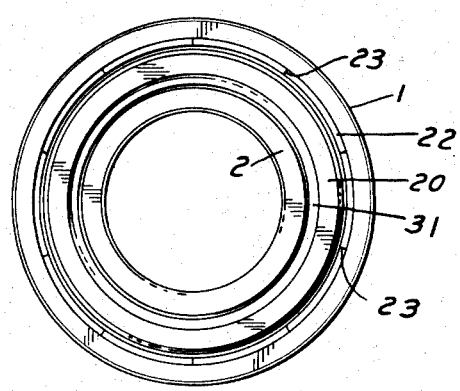
Fig. 3 is a side elevation of a bearing constructed in accordance with the invention.

The cooperating element of this shield is constituted by a ring of thin elastic metal generally illustrated at 20. It has an outer marginal portion 21 adapted to be abutted against the wall 7 and it has a bead at its outer peripheral edge as shown at 22 which is expanded into the groove so that it is securely held in position. This holding ring element may embody the bead structure as disclosed in the O. W. Koepp Patent No. 2,355,805, of August 15, 1944, and the bead may be divided into segments on division lines (Fig. 3) as shown at 23 with the segments of the bead expanded into the groove. This holding ring or plate has an inclined part 25 which extends inwardly toward the inner race at an angle to a radial plane and a substantially radially disposed portion 27. The inner marginal portion is fashioned into a concavo-convex cross sectional shape as particularly shown in Fig. 2. The convex face, as shown at 30, is innermost and frictionally engages with yielding pressure the outer face of the non-metallic ring element.

Figure 1:
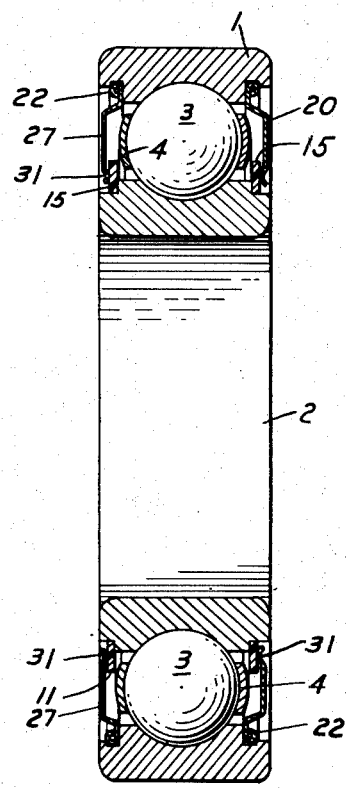
Fig. 1 is a cross sectional view taken through the bearing with two shield structures applied thereto.

In use, the relative rotation takes place between the non-metallic element and the holding ring with the convex face 30 frictionally sliding upon the face of the non-metallic element. The inherent yieldability of the element 20 maintains the frictional engagement which, however, is relatively light and because of the convex face 30, there is in theory at least, a circumferential line contact with the non-metallic element thus minimizing the area of frictional engagement. While this structure closes the space between the inner and outer race members and thus constitutes a seal, the element 15 also serves as an oil slinger as in its rotation it throws the oil radially outwardly and into the space of the rolling elements. A bearing may be provided with such a sealing or shielding structure on both sides, as shown in Fig. 1, and thus a quantity of lubricant may be maintained in the ball space. On the other hand, a bearing used in some places may only require one of such sealing elements. Should the bearing be used in a construction such as in a casing or housing in which it is desired to maintain the lubricant, the shield structure prevents lubricant from flowing through the space between the inner and outer race members.

I claim:

A seal structure in a bearing which has an outer race member, an inner race member, rolling elements between the race members, wherein the outer race member has an inwardly facing groove, the inner race member has a formation presenting a circumferential surface substantially concentric with the axis of the inner race member, and a substantially radial shoulder extending radially outwardly from said circumferential surface comprising, a first sealing ring of fabric reinforced thermo-setting material positioned on said circumferential surface and abutting against said shoulder, the radial dimension of said sealing ring being in excess of that of the shoulder so as to extend radially outwardly therefrom and thereby constitute an oil slinger, a second sealing ring of thin elastic metal having its outer peripheral portion anchored in the groove of the outer race member and having an inner marginal portion overlapping the first sealing ring on the outside thereof which is the side opposite the side of the shoulder and rolling elements, said marginal portion having a part fashioned into concavo-convex cross sectional form and the convex face thereof being in yieldable engagement with the outer face of the first named sealing ring, said convex surface engaging the first named ring substantially opposite said shoulder so that the first sealing ring is compressively held against said shoulder, and whereby the outwardly extending portion of the first named sealing ring is spaced from the second named sealing ring for oil slinging purposes.

CONE W. LIGHTHALL.

References Cited in the file of this patent

UNITED STATES PATENTS

| Number | Name | Date |
| --- | --- | --- |
| 1,889,397 | Baumheckel | Nov. 29, 1932 |
| 1,986,621 | Bott | Jan. 1, 1935 |
| 2,009,281 | Stein | July 23, 1935 |
| 2,054,580 | Delaval-Crow | Sept. 15, 1936 |
| 2,133,304 | Nichols | Oct. 18, 1938 |
| 2,140,091 | Murden | Dec. 13, 1938 |
| 2,144,691 | Schmal | Jan. 24, 1939 |
| 2,151,730 | Basche et al. | Mar. 28, 1939 |
| 2,277,810 | Zotter | Mar. 31, 1942 |
| 2,428,041 | Saywell | Sept. 30, 1947 |

OTHER REFERENCES

"Thermosetting Plastic Laminates," from Product Engineering of December 1948, pages 123 to 126, inclusive. (Copy in Div. 52.)